United States Patent [19]
Carlson et al.

[11] 3,918,575
[45] Nov. 11, 1975

[54] ARTICLE POSITIONING APPARATUS

[75] Inventors: Lloyd Carlson; Robert A. Schmitt, both of Vancouver, Wash.

[73] Assignee: Columbia Machine, Inc., Vancouver, Wash.

[22] Filed: Sept. 9, 1974

[21] Appl. No.: 504,424

Related U.S. Application Data

[62] Division of Ser. No. 330,297, Feb. 7, 1973.

[52] U.S. Cl. ................................. 198/284; 198/235
[51] Int. Cl.² ....................................... B65G 47/24
[58] Field of Search ............ 198/282, 284, 286, 34, 198/235; 214/6 P

[56] References Cited
UNITED STATES PATENTS

| | | | |
|---|---|---|---|
| 2,761,542 | 9/1956 | Pagdin | 198/286 |
| 2,805,753 | 9/1957 | Palmer | 198/282 X |
| 3,251,452 | 5/1966 | Conway | 198/34 |
| 3,269,513 | 8/1966 | Del Rosso | 198/282 |

Primary Examiner—Evon C. Blunk
Assistant Examiner—James L. Rowland
Attorney, Agent, or Firm—Kolisch, Hartwell, Dickinson & Stuart

[57] ABSTRACT

Article-positioning apparatus including a conveyor operable to support the undersides of a plurality of articles and convey them in succession along a path and an article turning arm which may be swung between an operative position extending into a portion of the path, and an inoperative position spaced outwardly from the path. In its operative position, the turning arm frictionally engages and holds an upright side, or corner portion, of an article to produce rotation of the article about the held portion as remainder portions of the article are conveyed in a downstream direction by the conveyor. The end of the arm which projects into the path of the conveyor curves in a downstream direction permitting an article to release smoothly therefrom and continue on the path of the conveyor after it has been turned to a desired position. An elongate lifting member projects in an upstream direction from the turning arm and is operable to lift a corner portion of the article adjacent the turning arm from the conveyor to aid in holding such corner portion while remainder portions of the article are rotated thereabout as moved in a downstream direction along the conveyor.

3 Claims, 11 Drawing Figures

ARTICLE POSITIONING APPARATUS

CROSS-REFERENCE TO RELATED APPLICATION

This is a divisional application of application Ser. No. 330,297, filed Feb. 7, 1973, entitled "Article Positioning and Stacking Apparatus."

BACKGROUND AND SUMMARY OF THE INVENTION

This invention relates to improved apparatus for positioning, or reorienting, articles as they are carried along a conveyor.

Various devices have been designed in the past for turning articles to selected positions as they are carried along a conveyor. For the most part, such article turning devices have been either excessively complex and expensive, or have been inefficient in their operation. Exemplary of the expensive and complex type are those which require stopping of the article, lifting of the entire article from the underlying support of the conveyor surface, and rotating it about a vertical axis, and then lowering the article again to the conveyor surface for further movement along the conveyor. Not only are such prior devices complex and expensive to produce, but they also are time consuming in that the article must be stopped, lifted, turned, and then returned to the conveyor and then its progress restarted.

A general object of the present invention is to provide novel article positioning apparatus which is simply and inexpensively constructed, yet which is operable efficiently to produce selected turning of articles carried along a path by a conveyor.

More specifically, an object of the invention is to provide such novel article positioning apparatus in which an article to be turned continues its movement along the path of the conveyor throughout the turning operation, thus to maintain a substantially unimpeded flow of articles along the conveyor.

More specifically, an object of the invention is to provide novel article positioning apparatus wherein a conveyor supports the undersides of articles carried in succession therealong, and a turning arm is shiftable selectively into and out of the path of a side portion of articles conveyed therealong. The turning arm, when contacting an upright side portion of an article, retains that portion of the article while remainder portions of the article swing thereabout while being carried by the conveyor, thus to turn the article.

Yet another object of the invention is to provide such novel apparatus in which the turning means also includes a device for raising from the article supporting surface of the conveyor a portion of the article adjacent that portion held by the turning arm, thus to produce more efficient turning of the article.

DRAWINGS

These and other objects and advantages will become more fully apparent as the following description is read in conjunction with the drawings, wherein.

DETAILED DESCRIPTION OF AN EMBODIMENT OF THE INVENTION

Figure 1:
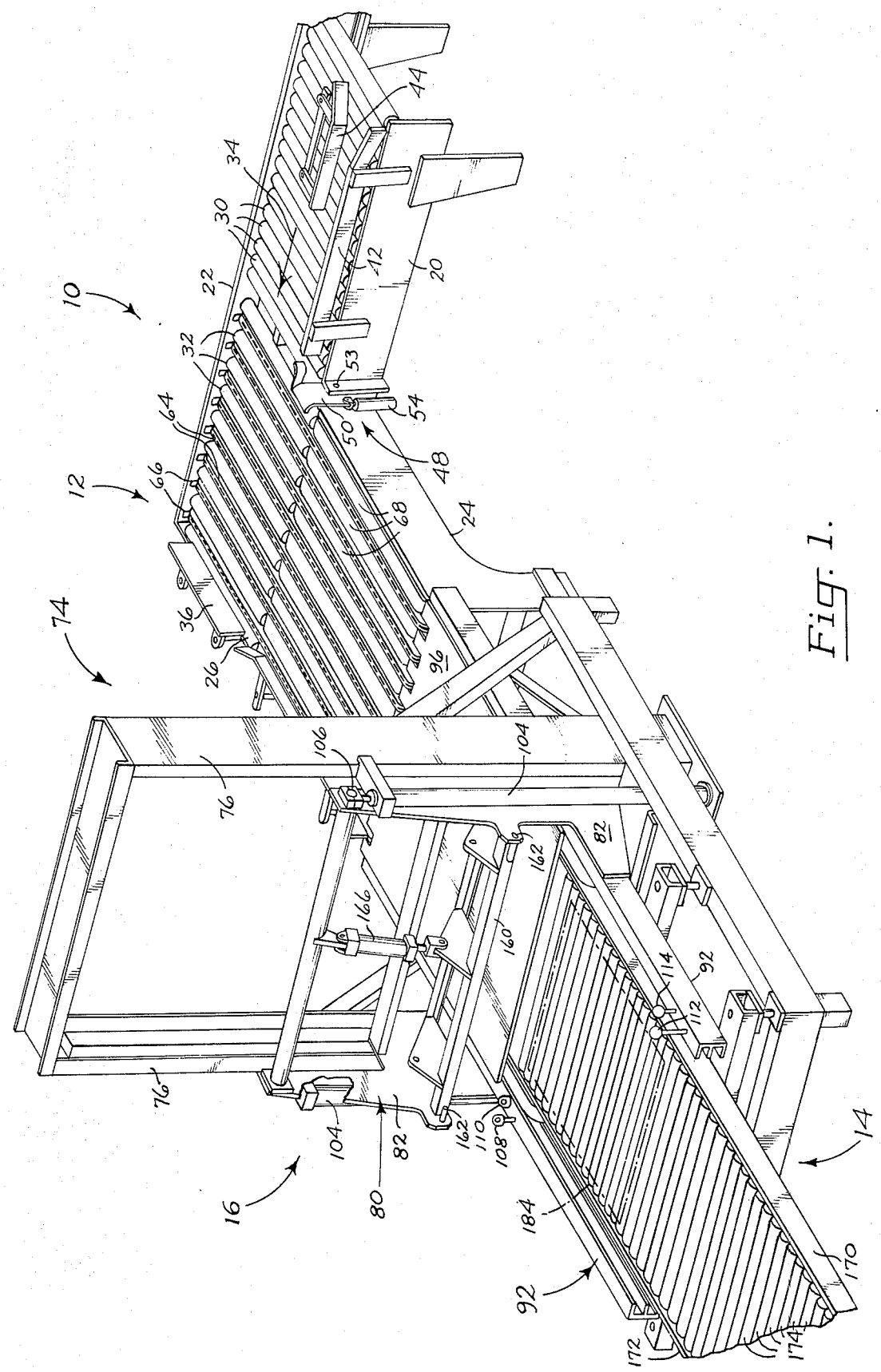
FIG. 1 is a perspective view of apparatus constructed in accordance with an embodiment of the invention.

Referring to the drawings, and first more specifically to FIG. 1, at 10 is indicated generally apparatus according to an embodiment of the invention. In general terms, the apparatus includes an article feed section 12, an article receiving section 14, and an article transfer section 16 disposed therebetween, operable to receive articles from the feed section and stack them in successively higher layers on the receiving section.

Feed section 12 includes a frame having a pair of laterally spaced, substantially parallel side rails 20, 22 and another pair of laterally spaced, substantially parallel side rails 24, 26 disposed at right angles to rails 20, 22. A plurality of horizontal, laterally spaced, elongated, power-driven rollers 30 are journaled adjacent their opposite sets of ends in rails 20, 22, adjacent one end of the rails. Other elongated, laterally spaced, power-driven rollers 32 are journaled for rotation at their opposite sets of ends in rails 20, 22 adjacent the opposite end of the rails. Rollers 30, 32 are all disposed with their upper surfaces lying in a substantially common horizontal article-support plane. Rollers 30, 32 are operable to support the undersides of articles and convey them in succession in the direction of arrow 34, until they either engage a stop bar 36 or engage a preceding article which has been moved against stop bar 36.

A guide bar 42 is secured to rail 20 and extends longitudinally therealong adjacent one set of ends of rollers 30. Another guide bar 44 is mounted over rollers 30 for selective adjustment toward and away from bar 42. These bars are operable to guide an article along a path adjacent side rail 20.

Figures 4, 5:
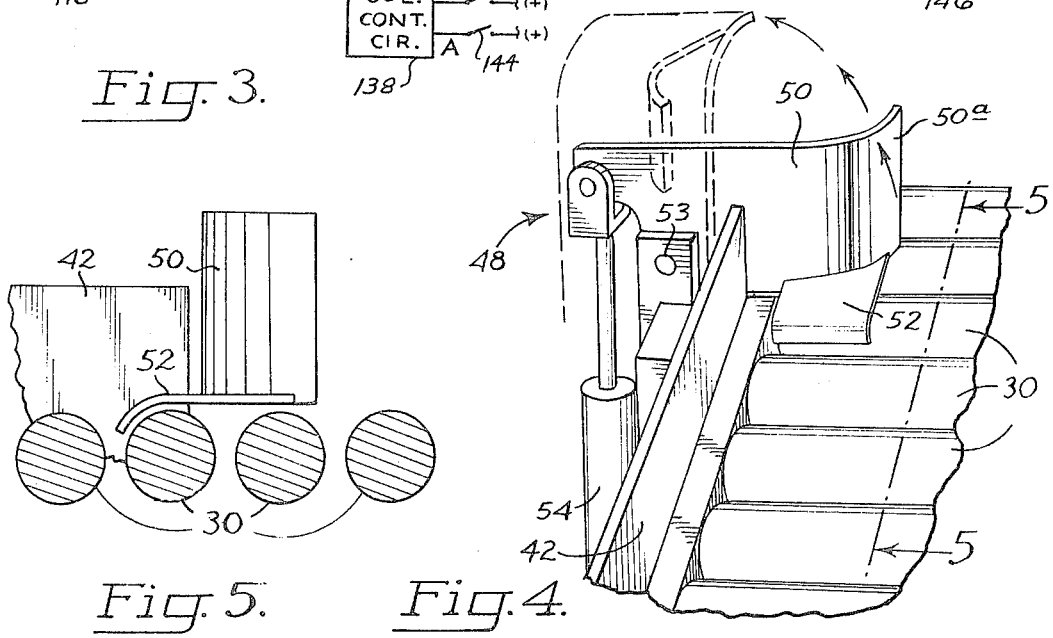
FIG. 4 is a perspective view, on an enlarged scale, of article turning means in the apparatus.
FIG. 5 is a cross-sectional view taken generally along the line 5—5 in FIG. 4.

An article turning means is indicated generally at 48. As is best seen in FIGS. 1 and 4, the turning means includes an elongate, turning arm, or element, 50 which has an arcuate end portion 50a overlying rollers 30. End portion 50a of arm 50 curves in a generally downstream direction relative to the conveyor. An arcuate lift plate 52 is secured to the bottom of end portion 50a of arm 50 and extends in an upstream direction therefrom. With arm 50 in the position shown in FIGS. 4 and 5, the end of plate 52 secured to arm 50 is spaced above the elevation of the article-supporting upper surfaces of rollers 30. On progressing in an upstream direction from arm 50 plate 52 extends over a roller 30 and in a region adjacent its upstream end, plate 52 curves downwardly over the upstream side of one of rollers 30, terminating in a region between a pair of adjacent rollers 30 at an elevation below the upper surfaces of the rollers.

Plate 50 is pivotally connected at 53 to side rail 20 for swinging about a horizontal axis paralleling the side rail. Arm 50 and plate 52 thus may be swung between the operative position illustrated in solid outline in FIGS. 4 and 5 extending laterally into the side of the path along which articles are carried by the conveyor, and an inoperative position illustrated in solid outline in FIG. 1 and in dashed outline in FIG. 4, out of the path of articles carried on the conveyor.

The rod end of an upright, fluid-operated extensible-contractible ram 54 is pivotally connected to the rear end of arm 50 and is operable, on extension and retraction, to swing the arm between its said operative and inoperative positions.

Figure 11:
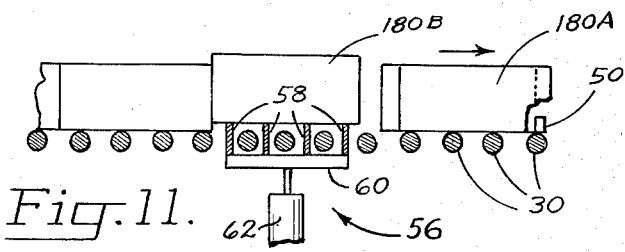
FIG. 11 is a schematic view, on an enlarged scale, of article stop means taken generally along the line 11—11 in FIG. 6.

Referring to FIG. 11, disposed upstream on the feed conveyor section from article turning means 48 is article stop means indicated generally at 56. The stop means includes a plurality of elongated, laterally spaced, bars 58 (seen in end view in FIG. 11) which are parallel to and disposed intermediate a plurality of rollers 30. Bars 58 are mounted on a common support 60 which is secured to the rod end of an upright ram 62. When ram 62 is retracted, the upper edges of bar 58 are below the top surfaces of rollers 30, and when ram 62 is extended, the upper edges of the bars project above the top surfaces of rollers 30. The bars thus are operable to engage the underside of an article positioned upstream on the feed conveyor from turning means 48 to lift the article from rollers 30, as illustrated.

This lifting of an article from rollers 30 stops such article and those following it on the rollers. This allows the preceding article to continue downstream along the rollers to be turned by turning means 48, as will be explained in greater detail below.

A plurality of elongated, endless chains 64 having upper reaches which are substantially longer than rollers 32 extend between rollers 32 in the direction of transfer section 16. Chains 64 have lugs 66 secured thereto which project upwardly from the chains above the top surfaces of rollers 32. The chains are connected to drive means which is operable to drive them, in unison, whereby lugs 66 move from the positions shown in FIG. 1, adjacent rail 22, toward transfer section 16. The drive means is operable to drive the chains whereby the lugs move to any desired position between rollers 32 and the downstream ends of the chains adjacent the transfer section, and then retracts them to the position illustrated, with lugs 66 adjacent rail 22. Such lugs, as will be explained in greater detail below, are operable to engage the sides of articles supported on rollers 32 and shove them onto a plurality of stationary, horizontal support bars 68 disposed between rollers 32 and the transfer section.

Figure 2:
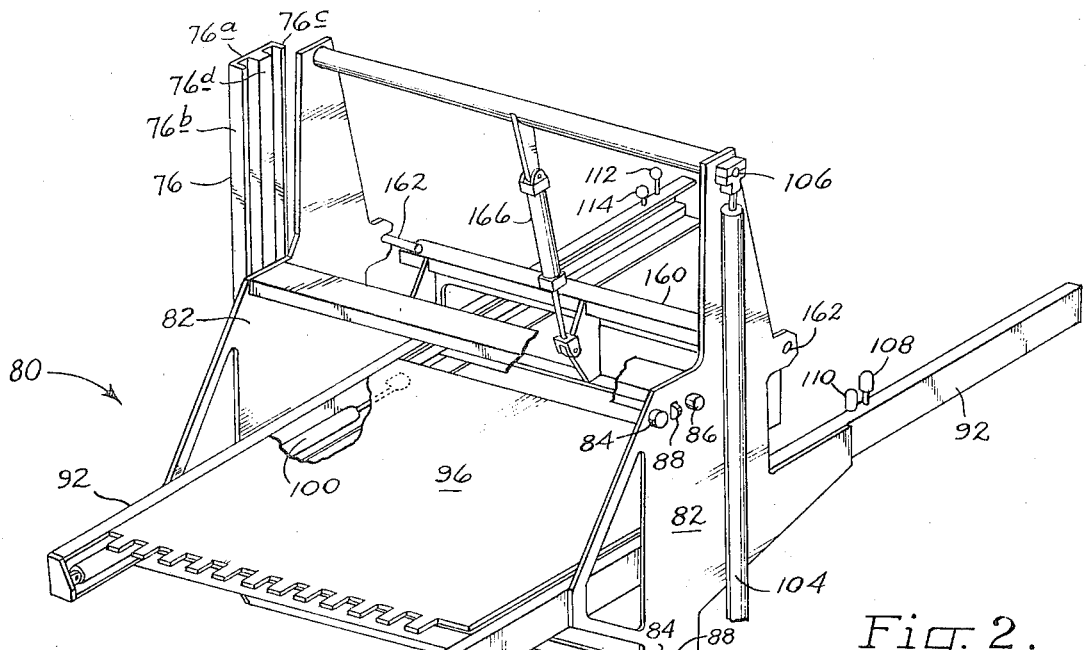
FIG. 2 is a perspective view of a carriage and slide plate mounted thereon removed from the remainder of the apparatus, as seen from the opposite side of the apparatus as viewed in FIG. 1.

Referring now to transfer section 16, it includes a substantially upright frame 74 having upright, laterally spaced columns 76. As is best illustrated in FIG. 2 where portions of columns 76 are illustrated, each column includes a channel having an upright web portion 76a with flanges 76b, 76c extending along opposite edges of the web. An elongated guide bar 76d is secured to web 76a intermediate flanges 76b, 76c.

A carriage, indicated generally at 80 in FIGS. 1 and 2, is mounted for vertical movement on frame 74. As is best seen in FIG. 2, the carriage includes a pair of laterally spaced side plates 82. Each side plate has three rollers, such as those indicated generally at 84, 86 and 88, adjacent its bottom, and a similar group of rollers spaced thereabove. Rollers 84, 86 are positioned to engage opposite sides of guide bar 76d on column 76, and roller 88 is positioned to engage the face of bar 76d, thus to support and guide the carriage for movement vertically along column 76.

The carriage also includes a pair of parallel, elongated, laterally spaced, horizontal guide arms 92 which are secured to and cantilevered outwardly at their opposite sets of ends from side plates 82. As is best seen in FIG. 1, one set of ends of arms 92 straddle a portion of article-receiving section 14 and the other set of ends of the arms is adjacent the downstream set of ends of chains 64 and bars 68.

A flat, rectangular, horizontal slide plate 96 is mounted for horizontal movement longitudinally on arms 92. The plate is movable between a first position adjacent one set of ends of arms 92 closely adjacent chains 64, and another position adjacent the opposite set of ends of the carriage arms wherein the slide plate is positioned over a portion of article-receiving section 14. As is seen in FIGS. 1 and 2, one end of slide plate 96 is notched to receive the downstream ends of chains 64.

A pair of elongated, substantially horizontal, double-acting, fluid-operated rams, such as that indicated generally at 100 in FIG. 2, are positioned adjacent and substantially parallel to arms 92 of the carriage. Rams 100 are connected at their cylinder ends to arms 92 and at their rod ends to the underside of slide plate 96. Extension and retraction of rams 100 shifts the plate between opposite ends of arms 92.

Disposed outwardly of side plates 82 of the carriage are a pair of elongated, upright, double-acting, fluid-operated rams 104. The rams are secured at their cylinder ends to a base plate supporting frame 74 and are directly connected at their rod ends to carriage 80 by journal connectors 106. Such direct connection between the ram and carriage permits the carriage to be raised or lowered along the frame under power at the same speed at which the rams are able to extend and contract. The direct connection further assures that a unit change in length of rams 104 results in an equivalent unit change in vertical position of the carriage.

Mounted on one of arms 92 where the arms straddle the region over article-receiving section 14 are a pair of vertically spaced photocells 108, 110. Photocell 108 is higher than photocell 110.

Light sources 112, 114 are mounted on the other carriage arm. Light source 112 is higher than light source 114, and they are operable to direct beams of light toward photocells 108, 110, respectively.

Each photocell is operable to produce a signal at its output side when light beamed from its associated light source is received and ceases producing a signal when the light from its associated light source is blocked.

Figure 3:
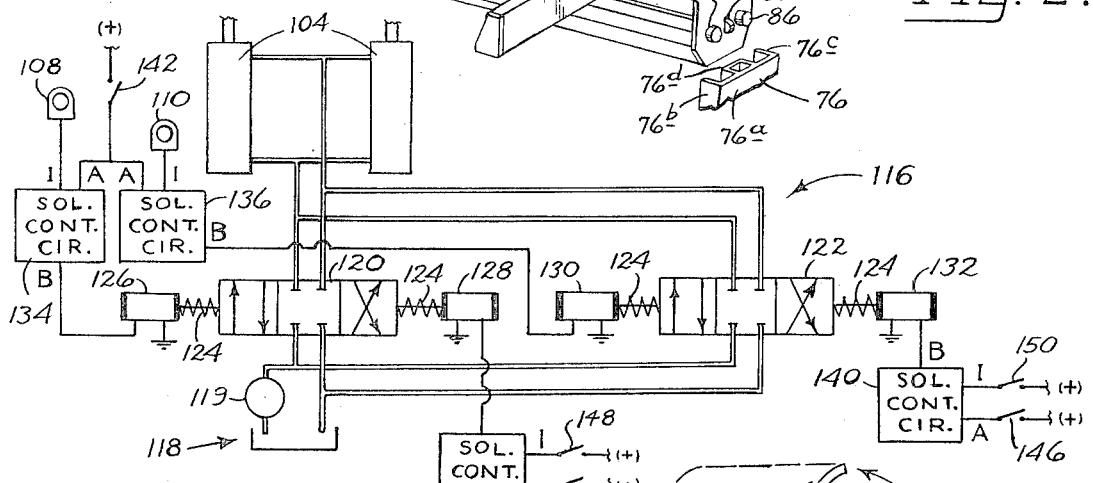
FIG. 3 is a schematic diagram of a system for supplying operating fluid to a pair of rams for raising and lowering the carriage illustrated in FIG. 2.

Referring to FIG. 3, at 116 is indicated generally a conduit system for supplying fluid under pressure from a fluid pressure source 118, including a pump 119, to rams 104. The system includes a pair of infinitely positionable, solenoid controlled, pilot operated, four-way valves 120, 122 which are connected in parallel in the system and are operable to control the supply and exhaust of pressure fluid to rams 104. The valve spool for each of the valves is illustrated schematically in a closed position in which it neither supplies nor exhaust fluid from the rams. Shifting the spool of a valve to the right in FIG. 3 opens the valve so that fluid under pressure may be supplied to the lower sides of the rams and exhausted from the upper sides, thus to extend the rams and raise carriage 80. Conversely, shifting the spool of a valve to the left from the position illustrated, supplies fluid under pressure to the upper sides of the rams and exhausts it from the bottom sides, thus to contract the rams and lower carriage 80 under power.

Valves 120, 122 normally are biased to their closed positions as by springs 124, at opposite ends of the valve spools. As mentioned previously the valves are solenoid operated; valve 120 having solenoids 126, 128 operatively connected thereto for shifting the valve spool in opposite directions and valve 122 having solenoids 130, 132 operatively connected thereto for shifting the valve spool in opposite directions.

Associated with and operatively connected to each of solenoids 126, 128, 130, 132 are solenoid control circuits with inhibit functions indicated at 134, 136, 138, 140, respectively. Each solenoid control circuit is so constructed that when a signal is received at its input terminal designated A, and with no inhibit signal present at its inhibit input terminal designated I, a signal will be produced at its output terminal B to energize its associated solenoid. When a signal is present at inhibit input terminal I, the solenoid control circuit ceases to produce an energizing signal at its output terminal B and is prevented from doing so until the signal is removed from its inhibit input terminal.

Referring to solenoid control circuits 134, 136, each has its input terminal A connected to one side of a switch 142, the opposite side of which is connected to a current source. The inhibit input terminal I of circuits 134, 136 are connected, respectively, to the output sides of photocells 108, 110. The output terminals B of control circuit 134, 136 are operatively connected to solenoids 126, 130, respectively.

The input terminals A of circuits 138, 140 are each connected to one side of switches 144, 146, respectively, the opposite sides of which are connected to a current source. Output terminals B of circuits 138, 140 are operatively connected to solenoids 128, 132, respectively.

Inhibit input terminals I of circuits 138, 140 are connected to one side of normally open limit switches 148, 150, respectively. The opposite sides of the limit switches are connected to a current source. Limit switches 148, 150 are so positioned in the apparatus that they are closed by the carriage as it is lowered to a position in which slide plate 96 is at the elevation of bars 68. Limit switch 148 is so positioned that it is closed, on lowering of the carriage, shortly prior to slide plate 96 reaching the elevation of bars 68, and limit switch 150 is so positioned that it is closed to stop the slide plate at the elevation of bars 68, as will be explained in greater detail below.

Considering briefly the operation of the system illustrated in FIG. 3, when switch 142 is closed and light is blocked from photocells 108, 110, signals are produced at output terminals B of circuits 134, 136, thus to energize solenoids 126, 130 which shift their associated valve spools to the right to supply pressure fluid to rams 104, to raise the carriage. Should a beam of light from a light source be received at a photocell, that photocell presents an inhibit signal to its associated solenoid control circuit, thus to deenergize the solenoid, permitting its associated valve to return to its closed position. Closing of one of the valves operates to slow supply of pressure fluid to rams 104 thus slowing the raising of the carriage. Closing of both valves stops raising of the carriage.

To lower the carriage from such a raised position to a position in which slide plate 96 is at the elevation of bars 68, switch 142 is opened, and switches 144, 146 are closed, whereby solenoids 128, 132 are energized to shift the spools of valves 120, 122 to the left to produce retraction of rams 104 and thus lowering of the carriage. As the carriage nears the elevation of bars 68, limit switch 148 is closed to produce an inhibit signal at input terminal I of circuit 138, thus to deenergize solenoid 128 and close valve 120 to slow lowering of the carriage. Further lowering of the carriage at a slower speed produces closing of limit switch 150, producing an inhibit signal at input terminal I of circuit 140, thus deenergizing solenoid 132 and closing valve 122 to stop lowering of the carriage with slide plate 96 substantially at the elevation of bars 68.

With such construction the carriage may be raised and lowered under power, with stopping of the carriage on raising being controlled by the photocells, and lowering being controlled by operation of the limit switches.

Figure 7:
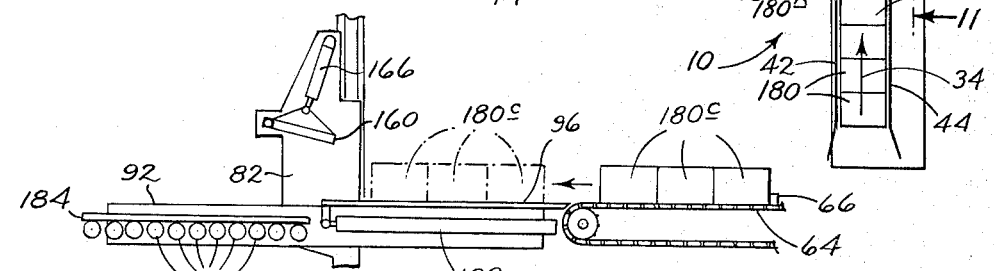
FIGS. 7 through 10 are schematic side elevation views of sequential steps in a package stacking operation for the apparatus.
Figure 8:
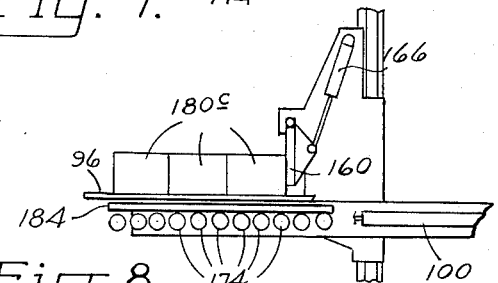
Figure 9:
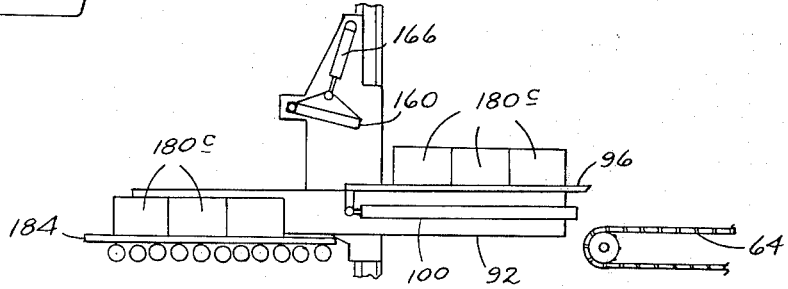
Figure 10:
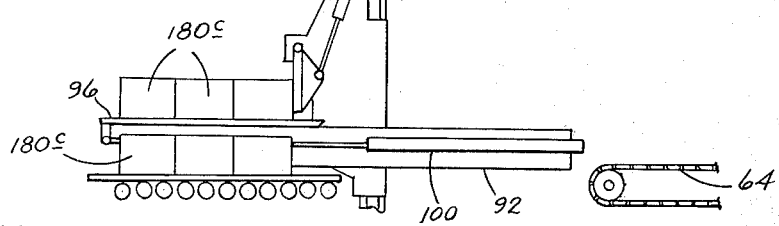

Extending between side plates 82 on carriage 80, is an elongated fence 160. The fence is pivotally mounted on side plates 80 by journal connections 162 disposed at opposite ends of the fence and adjacent one of its edge margins. Journal connections 162 provide a substantially horizontal pivot axis for the fence spaced above slide plate 96. The fence is swingable between a raised, inoperative position, as seen in FIGS. 1, 7 and 9, spaced a distance above slide plate 96, and a lowered, substantially upright, operative position, as seen in FIGS. 2, 8 and 10, wherein its lower edge margin is closer to plate 96.

An elongated, double-acting ram 166 is operatively connected to fence 160, whereby retraction of the ram swings the fence to its raised, inoperative position, and extension of the ram lowers the fence to its operative position.

As is illustrated in FIG. 1, receiving section 14 includes a pair of elongated, substantially parallel, laterally spaced side rails 170, 172. A plurality of elongated, laterally spaced, rollers 174 extend between and are journaled at their opposite sets of ends on side rails 170, 172. The upper surfaces of rollers 174 lie in a substantially common plane.

Figure 6:
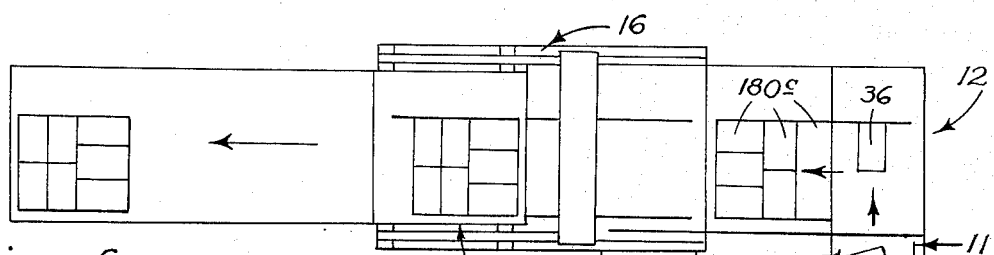
FIG. 6 is a schematic top plan view, on a reduced scale, of the apparatus illustrated in FIG. 1 during operation.

Explaining now the operation of the apparatus for forming a stack of articles on receiving section 14, articles, such as the rectangular cartons illustrated generally at 180 in FIG. 6, are placed on infeed conveyor rollers 30 and are conveyed therealong in succession in the direction of arrow 34 between guide bars 42, 44. Depending upon the desired arrangement and positioning for cartons in a stack to be formed, selected ones of the cartons may be turned 90° about a vertical axis from the orientation they have on passing between guide bars 42, 44.

If a carton, such as that indicated at 180A in FIGS. 6 and 11, is to be turned, ram 54 is actuated to swing arm 50 to its operative position, as shown in solid outline in FIG. 4, prior to the carton reaching the turning means, and stop means 56 is actuated, whereby bars 58 lift the next-following carton 180B from the rollers and stop following cartons. This provides a clearance space between cartons 180A, 180B to permit relatively free turning of carton 180A. Carton 180A is conveyed along rollers 30 until an upright side, or corner, portion thereof facing in a downstream direction engages arm 50. This portion of the carton also is raised from the rollers by riding up and onto member 52 while remainder portions of the article remain on the rollers. The corner engaged by arm 50 is frictionally held by the arm while the remainder of the article is carried along the conveyor. As rollers 30 continue to operate, carton 180A is rotated in a counterclockwise direction as viewed in FIG. 6 about the portion engaged by arm 50 until it is turned 90° from its original orientation. It then disengages from arm 50 by sliding smoothly off curved portion 50a and continues along rollers 32 until stopped by stop bar 36, or a previously stopped carton on rollers 32. After carton 180A has been turned, ram 62 contracts, lowering bars 58 to allow carton 180B to pass. If carton 180B is to be turned, arm 50 remains in its path, and bars 58 are raised to lift the next-following carton in the row from the rollers. If carton 180B is not to be turned ram 54 is contracted to swing arm 50 to its inoperative position to let the article pass.

After carton 180A and other cartons sufficient to form a row of desired length have been stopped by stop bar 36 on rollers 32, chains 64 are actuated, whereby lugs 66 engage the sides of the cartons and shove them onto the region of support bars 68. A group of cartons which have been moved previously off rollers 32 onto bars 68 are indicated generally at 180c in FIG. 6. The chains are operable to move one row of cartons at a time onto the area of support bars 68, and then retract again to the position shown in FIG. 1, with lugs 66 adjacent side rail 22 of the frame. As is seen in FIG. 6, a layer of cartons thus may be arranged on bars 68, with selected ones of the cartons in the layer positioned at right angles to other cartons in the layer.

When a layer has been arranged as desired on support bars 68, and slide plate 96 has been positioned adjacent the downstream set of ends of chains 64, as seen in FIGS. 1 and 7, chains 64 are driven, whereby lugs 66 move to the left in FIGS. 1 and 7, and engage one side of the cartons in the layer. Continued operation of the chains shoves the layer of cartons onto the slide plate, as indicated by the cartons illustrated in dot-dashed outline at 180C.

It will be noted in FIG. 7 that fence 160 is raised to a position above the elevation of the tops of cartons 180C. A pallet 184 is illustrated supported on rollers 174 of the article-receiving section between arms 92 in FIG. 7. The pallet's position also is illustrated in dot-dash outline in FIG. 1.

After a layer of cartons 180C has been received on plate 96, the plate and cartons are shifted to the left, by extension of rams 100, as illustrated in FIG. 8, to place the slide plate and cartons over rollers 174 and pallet 184. Ram 166 then is extended to swing fence 160 down into its operative position adjacent the backside of the layer of cartons. Rams 100 then are contracted to retract slide plate 96 to the right toward the ends of arms 92 adjacent the downstream ends of chains 64. As the slide plate is retracted, fence 160 prevents cartons 180C from returning therewith and the same are wiped off slide plate 96 and are deposited on pallet 184, as shown in FIG. 9.

With the slide plate again positioned adjacent the downstream ends of chains 64, another layer of cartons which have been positioned as desired by the turning means and chains 64 on bars 68 are shifted onto slide plate 96, as is illustrated by cartons 180D in FIG. 9. When cartons 180D are received on the slide plate, switch 142, illustrated in FIG. 3, is closed to produce a signal at terminals A of circuits 134, 136. The light from sources 112, 114 is blocked from photocells 108, 110 by cartons 180C on pallet 184 and thus no signal is present at inhibit input terminals I of circuits 134, 136. A signal thus is produced at terminals B of circuits 134, 136 to energize solenoids 126, 130, open valves 120, 122, and produce extension of rams 104, raising the carriage, slide plate, and cartons supported thereon.

As photocell 108 and its associated light source 112 are raised with the carriage above the level of cartons 180C, the light from source 112 shines on photocell 108 which produces a signal at inhibit input terminal I of circuit 134, which, in turn, deenergizes solenoid 126 permitting valve 120 to return to its closed position. This closing of valve 120 slows raising of the carriage by closing off a portion of the fluid flow through the conduit system to rams 104. As the carriage is raised further, at a slower rate, photocell 110 and its associated light source 114 eventually are raised with the carriage above the level of cartons 180C, whereby the light from source 114 shines on photocell 110 which deenergizes solenoid 130. This permits valve 122 to return to its closed position resulting in closing off of fluid supply to rams 104, and stopping them. It should be noted at this point that valves 120, 122 have what may be referred to as slow-acting spools, whereby the spools of the valves move relatively slowly from their open to their closed positions, thus to gradually and gently cut off the flow of fluid to the rams and cushion their stopping.

Once the carriage has reached a position above the level of cartons 180C, as sensed by the photocells, and the carriage is stopped, as illustrated in FIG. 9 with fence 160 raised, rams 100 are extended to position slide 96 and cartons 180D over cartons 180C previously placed on pallet 184. This is illustrated in FIG. 10. At this point switch 142 is opened also.

Fence 160 then is swung into its operative position adjacent the back side of the layer of cartons 180D as shown in FIG. 10. Ram 100 and plate 96 are retracted toward the right end of the carriage arms to wipe cartons 180D from the slide plate onto the tops of cartons 180C. The carriage then is lowered under power by closing switches 144, 146 which shifts the spools of valves 120, 122 to the left to supply fluid under pressure to the upper sides of rams 104 and exhaust fluid from their lower sides.

As the carriage thus is lowered under power and slide plate 96 nears the elevation of bars 68, limit switch 148 is closed to produce an inhibit signal at terminal I of circuit 138, deenergizing solenoid 128 and closing valve 120. Further lowering, at a slower speed, closes limit switch 150 to deenergize solenoid 132, close valve 122 and stop the carriage with slide plate 96 at substantially the elevation of bars 68. This positions the slide plate once again adjacent the downstream end of chain 64. The above-described sequence is repeated until a desired number of layers of cartons have been stacked on pallet 184, after which it is conveyed away from the transfer station.

It should be understood that the apparatus may be controlled by automatic sequencing means to produce the desired turning of selected cartons, shifting of an arranged layer onto the slide plate, raising and lowering of the carriage and fence, and extension and retraction of the slide plate.

The apparatus thus described is operable quickly and efficiently to position articles as desired for stacking in a layer, and for stacking them in multiple layers. The novel turning mechanism provides a simple and effective means for turning selected articles as they are conveyed along the infeed means, and the powered raising and lowering of the carriage of the transfer mechanism provides for rapid operation of the transfer mechanism.

While a specific embodiment of the invention has been described herein, it should be apparent to those skilled in the art that variations and modifications are possible without departing from the spirit of the invention.

It is claimed and desired to secure by Letters Patent:

1. Article positioning apparatus comprising
    a conveyor operable to support the undersides of a plurality of articles and convey them in succession along a path, said conveyor including a pair of adjacent, substantially parallel, laterally spaced rollers having upper surfaces which define a portion of the conveyor support for articles carried thereover, and
    article turning means adjacent said conveyor including an elongate arm projecting laterally into a side of the path along which articles are carried by said conveyor for frictionally engaging and holding an upright side portion of an article to produce rotation of the same about the portion engaged as remainder portions of the article are conveyed along said path and an elongate lifting member secured at one of its ends to said arm and projecting in an upstream direction therefrom over the downstream roller in said pair of rollers in said conveyor and curving downwardly in a region adjacent its opposite end to terminate between said rollers and below the level of the upper surfaces of the roller to present an upper, article-engaging surface, which on progressing away from said arm inclines downwardly from an elevation above the elevation of the article support surface of the conveyor to an elevation below the elevation of the conveyor, said lifting member being operable to raise a portion of the article adjacent said arm from the conveyor with remainder portions of the article remaining supported on the conveyor.

2. The apparatus of claim 1, wherein said arm is mounted for shifting between a first position extending into the path of an article carried on said conveyor and a second position spaced outwardly from the path of an article on the conveyor and which further comprises operator means operatively connected to said arm for producing such shifting.

3. The apparatus of claim 2, which further comprises pivot means mounting said arm for swinging between its said first and second positions, and said operator means comprises an extensible-contractible ram operatively connected to said arm for swinging said arm between said positions.

* * * * *